June 24, 1930.                C. ADAM                1,767,954
                            OIL ROD WIPER
                         Filed Nov. 29, 1929

Inventor
Carl Adam

By Clarence A. O'Brien
                    Attorney

Patented June 24, 1930

1,767,954

UNITED STATES PATENT OFFICE

CARL ADAM, OF EASTON, PENNSYLVANIA

OIL-ROD WIPER

Application filed November 29, 1929. Serial No. 410,578.

This invention relates to an improved vehicle accessory, especially one which is adapted for use in association with automobile motors and it has reference to a novel wiping device for an oil measuring rod frequently referred to in the art as a ullage rod.

It is a matter of common knowledge that on many of the present day automobile engines and motors as they are variously referred to, an oil or ullage rod is provided on the crank case. This rod, in fact, extends through an opening in the crank case and the rod is of a depth to extend down to the bottom of the oil pan and on the upper end of the rod is an appropriate knob or handle.

Whenever the owner of the car desires to determine the approximate amount of lubricating oil in the crank case, he catches hold of the knob and pulls the rod out. Before an accurate measurement may be made, however, it is necessary to wipe the rod substantially dry. This requires the use of a rag and as a general rule unless the measuring operation is deftly carried out, the operator will soil his hands and frequently his clothes. This makes the job undesirable and objectionable.

With the foregoing in mind I have evolved and produced a simple and inexpensive appliance in the nature of a wiper which can be attached to the frame of the automobile or to the motor in a convenient position so that upon withdrawing the ullage rod from the crank case, the shank portion thereof may be forced down through the wiper to remove the surplus oil therefrom and render the rod in condition for re-insertion to the crank case and subsequent withdrawal to determine the oil depth measurement.

In the drawing:—

Figure 1:
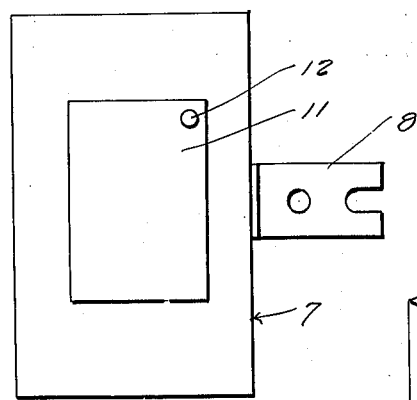
Figure 1 is a top plan view of a structure constructed in accordance with the present invention.
Figure 4:
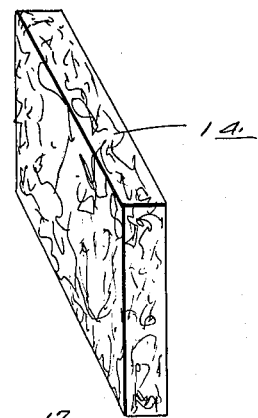
Figure 4 is a perspective view of a wiper felt block.

Referring now to the drawing by reference numerals it will be observed that the appliance is in the nature of an attachment and comprises a suitably constructed metal casing or housing generally designated by the reference character 7. It is here shown as of rectangular configuration and it is provided with an L-shaped attaching bracket 8. This bracket is adapted to be fastened to the chassis or to the motor by simply removing one of the retaining head bolts or nuts and slipping the bracket thereunder and replacing the nut. This suspends the device in a position for convenient use. The casing is provided at its top with an insertion hole 9 and directly beneath this and in its bottom is a complemental hole 10. There is a pivoted shutter plate 11 covering the top hole 9 and this is pivoted to the casing as at 12. On the bottom is a hinged closing leaf 13 for the hole 10 having a return spring associated with the hinge thereof for normally maintaining the leaf in closed position. This leaf is somewhat in the nature of a trap door for retaining lubricant in the casing.

Figure 5:
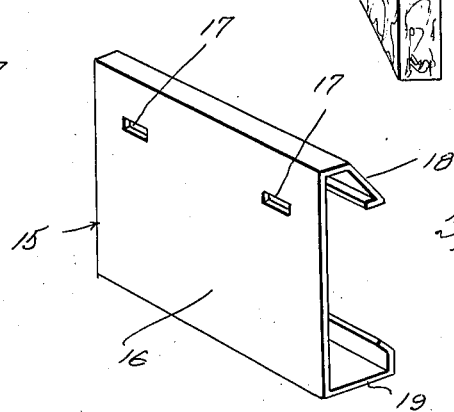
Figure 5 is a perspective view of a carrier and mounting for the felt block.
Figure 2:
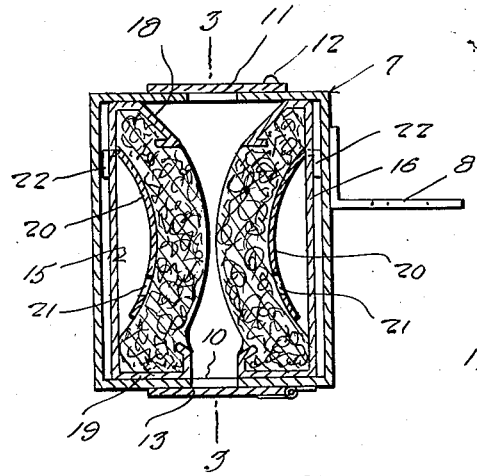
Figure 2 is a central vertical sectional view of the same.
Figure 3:
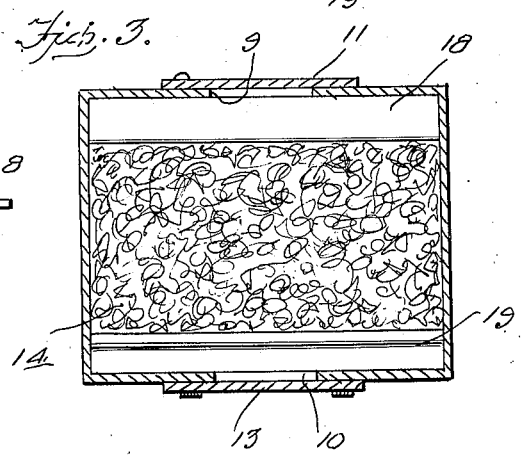
Figure 3 is a longitudinal section on the line 3—3 of Figure 2.
Figure 6:
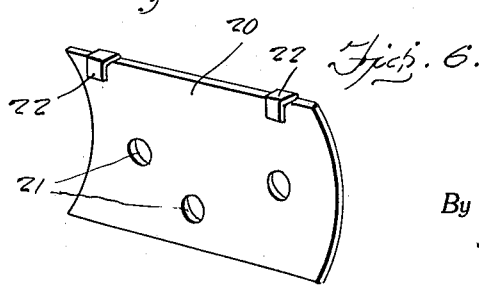
Figure 6 is a perspective view of a semi-elleptical spring for bowing the felt pad or block.

Mounted in the casing are absorbent pads 14 of duplicate design. Each pad is of absorbent felt of general rectangular form. These pads are bowed transversely so that their crest portions are in closely spaced relation and in alignment with the holes 9 and 10 to permit the ullage rod (not shown) to be slipped therebetween and withdrawn in order to wipe the oil therefrom. These wipers are mounted in carriers. Each carrier is designated by the reference character 15 and comprises (see Figure 5) a rectangular plate 16 having keeper holes or slots 17 and provided with channel shaped retaining devices 18 and 19 along its upper and lower longitudinal edges. Associated with each carrier and pad is a semi-elliptic spring 20 as seen in Figure 6 and this is provided with passages 21 for the surplus oil. In addition it is formed on its upper edge with hooks 22 adapted to be detachably engaged with the keeper slots 17 as shown in Figure 2. Thus, each wiper assembly comprises the absorbent pad, the channel equipped carrier, and semi-elliptic spring attached thereto. The spring is interposed between the plate 16 and the adjacent pad 14 causing the pad to be bowed transversely as shown in Figure 2. Hence when the pads are placed in position they assume the curved relationship shown in Figure 2.

In practice, it is obvious that the shutter 11 is swung to one side on pivot 12 to uncover the top hole 9. Then the ullage rod, whose stem portion is then filled with crank case oil is forced down between the two absorbent pads 14 and pushed through the hole 10 and in so doing forces the leaf 13 out of the way. The rod is then withdrawn and the surplus oil is taken up by the pads. As the rod is withdrawn the door or leaf 13 closes under the action of the spring equipped end. The rod (now clean and dry) is ready to be re-inserted in the crank case for measuring the depth of the oil therein in an obvious manner.

From the foregoing description and drawings it will be seen that I have evolved and produced a simple, economical, and practical wiping device for ullage rods which may be conveniently attached and conveniently used for acquiring dependable results.

A person skilled in the art to which the invention relates will be able to obtain a clear understanding of the same after considering the description in connection with the drawings, and therefore a more lengthy description is regarded as unnecessary.

Minor changes in the shape, size and rearrangement of details coming within the scope of the invention as claimed may be resorted to in actual practice.

I claim:—

1. In a ullage rod wiping device of the class described, a casing provided with aligned holes for passage of said rod, means for normally closing said holes to exclude dirt and dust, and wiping means in said casing, said wiping means comprising a pair of opposed closely spaced absorbent pads, said pads being curved in reversed directions with respect to each other to dispose the central crown portions thereof in closely spaced proximity, to facilitate insertion and removal of the rod.

2. In an oil rod wiping device of the class described, a casing provided at the top and bottom with vertically aligned holes and covering means for said holes, a pair of absorbent pads in said casing disposed in opposed spaced relationship to permit the rod to be passed therebetween, a pair of carriers for said pads, each carrier comprising a plate having retaining channels formed along its opposite longitudinal edges.

3. In an oil rod wiping device of the class described, a casing provided at the top and bottom with vertically aligned holes and covering means for said holes, a pair of absorbent pads in said casing disposed in opposed spaced relationship to permit the rod to be passed therebetween, a pair of carriers for said pads, each carrier comprising a plate having retaining channels formed along its opposite longitudinal edges, together with springs interposed between the pads and carriers and fastened to the carriers for resiliently bowing said pads transversely.

4. In an attachment of the class described, a housing provided in its top and bottom with rod holes disposed in vertically aligned relationship, closures for said holes, an attaching bracket on said casing, a pair of absorbent pads in said casing and resilient backing and bowing springs associated with said pads.

In testimony whereof I affix my signature.

CARL ADAM.